(12) United States Patent
Winter et al.

(10) Patent No.: US 12,244,235 B2
(45) Date of Patent: Mar. 4, 2025

(54) CONTROL METHOD FOR A DC-DC CONVERTER AND DC-DC CONVERTER

(71) Applicant: Robert Bosch GmbH, Stuttgart (DE)

(72) Inventors: Christian Winter, Tamm (DE); Jan Riedel, Esslingen Am Neckar (DE); Christoph Kienzler, Gerlingen (DE); David Cello, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 186 days.

(21) Appl. No.: 17/633,491

(22) PCT Filed: Jul. 23, 2020

(86) PCT No.: PCT/EP2020/070756
§ 371 (c)(1),
(2) Date: Feb. 7, 2022

(87) PCT Pub. No.: WO2021/028181
PCT Pub. Date: Feb. 18, 2021

(65) Prior Publication Data
US 2022/0360181 A1   Nov. 10, 2022

(30) Foreign Application Priority Data
Aug. 9, 2019 (DE) .................... 10 2019 211 968.9

(51) Int. Cl.
*H02M 3/335* (2006.01)
*H02M 1/00* (2006.01)
*H02M 1/08* (2006.01)

(52) U.S. Cl.
CPC ..... *H02M 3/33573* (2021.05); *H02M 1/0058* (2021.05); *H02M 1/08* (2013.01); *H02M 3/33584* (2013.01); *H02M 3/33592* (2013.01)

(58) Field of Classification Search
CPC .. H02M 3/33573; H02M 1/0058; H02M 1/08; H02M 3/33584; H02M 3/33592
See application file for complete search history.

(56) References Cited

U.S. PATENT DOCUMENTS 10,658,936 B2 * 5/2020 Sun .................... H02M 3/04
10,749,441 B1 * 8/2020 Singh ............... H02M 3/33584
(Continued)

FOREIGN PATENT DOCUMENTS

CN 103929065 A 7/2014
CN 108463935 A 8/2018
(Continued)

OTHER PUBLICATIONS

Translation of International Search Report for Application No. PCT/EP2020/070756 dated Sep. 18, 2020 (3 pages).
(Continued)

*Primary Examiner* — Kyle J Moody
(74) *Attorney, Agent, or Firm* — Michael Best & Friedrich LLP

(57) ABSTRACT

A method for a phase-shifted full-bridge DC-DC converter. The method controls the DC-DC converter for energy transmission from a secondary side to a primary side of the DC-DC converter. A transformer is arranged between the primary side and the secondary side of the DC-DC converter. The method comprises a switching state, in which the terminals of the primary side of the transformer are electrically connected to one another, and in which, furthermore, the terminals of the secondary side of the transformer and the terminals of the secondary side of the DC-DC converter are electrically connected to one another.

9 Claims, 4 Drawing Sheets

(56) References Cited

U.S. PATENT DOCUMENTS

| | | | |
|---|---|---|---|
| 2011/0249472 A1* | 10/2011 | Jain | H02M 3/33584 363/15 |
| 2012/0300502 A1* | 11/2012 | Shimada | H02M 1/4258 363/17 |
| 2013/0308344 A1* | 11/2013 | Rosado | H02M 3/33584 363/17 |
| 2014/0334189 A1 | 11/2014 | Yan et al. | |
| 2015/0214847 A1 | 7/2015 | Shimada et al. | |
| 2021/0083588 A1* | 3/2021 | Yaegaki | H02M 1/32 |

FOREIGN PATENT DOCUMENTS

| | | |
|---|---|---|
| CN | 109874376 A | 6/2019 |
| DE | 102016200662 A1 | 7/2017 |
| DE | 102016220358 A1 | 4/2018 |
| EP | 3324528 A1 | 5/2018 |
| JP | 2018133964 A | 8/2018 |
| KR | 20160141638 A | 12/2016 |
| WO | 2019064259 A1 | 4/2019 |

OTHER PUBLICATIONS

Muthuraj et al., "Triple Phase Shift Control of an LLL Tank Based Bidirectional Dual Active Bridge Converter", IEEE Transactions on Power Electronics, vol. 32, No. 10, 2017, pp. 8035-8053.

* cited by examiner

CONTROL METHOD FOR A DC-DC CONVERTER AND DC-DC CONVERTER

BACKGROUND OF THE INVENTION

The present invention relates to a method for controlling a DC-DC converter, in particular a phase-shifted full-bridge DC-DC converter. In addition, the present invention relates to a phase-shifted full-bridge DC-DC converter.

DC-DC converters are known for the conversion of a first DC voltage into a second DC voltage with a different voltage level. In particular, the group of DC-DC converters also includes so-called phase-shifted full-bridge DC-DC converters. These DC-DC converters can, under certain boundary conditions, also realize a power transfer from the secondary side to the primary side if active switching elements are also used on the secondary side. For example, DC-DC converters can be used to couple a high-voltage power supply system of an electric vehicle to the low-voltage power supply system of the vehicle and to transmit energy between the two vehicle power supply systems of such an electric vehicle.

Document DE 10 2016 200 662 A1 discloses a bidirectional DC-DC converter for energy transmission between a high-voltage power supply system and a low-voltage power supply system of an electric vehicle. The converter comprises at least one transformer for DC-isolation of the two vehicle power supply systems, electronic switches for reversing the polarity of the windings of the transformer, and a control device for controlling the switches. In particular, the DC-DC converter is intended to enable charging of a DC-link capacitor on the high-voltage side.

SUMMARY OF THE INVENTION

The present invention discloses a method for controlling a DC-DC converter and a DC-DC converter.

Accordingly, the following is provided:
A method for controlling a DC-DC converter, in particular a phase-shifted full-bridge DC-DC converter. The DC-DC converter is intended for, inter alia, energy transmission from a secondary side to a primary side of the DC-DC converter. A transformer is arranged between the primary side and the secondary side of the DC-DC converter. The method comprises a switching state, in which the terminals of the primary side of the transformer are electrically connected to one another, and in which, furthermore, the terminals of the secondary side of the transformer and the terminals of the secondary side of the DC-DC converter are electrically connected to one another.

Furthermore, the following is provided:
A phase-shifted full-bridge DC-DC converter comprising a first full-bridge, a second full-bridge, a transformer and a control device. The first full-bridge comprises a first switching element, which is arranged between a first primary terminal and a first node, a second switching element, which is arranged between the first node and a second primary terminal, a third switching element, which is arranged between the first primary terminal and a second node, and a fourth switching element, which is arranged between the second node and the second primary terminal. The second full-bridge comprises a fifth switching element, which is arranged between a first secondary terminal and a third node, a sixth switching element, which is arranged between the third node and a second secondary terminal, a seventh switching element, which is arranged between the first secondary terminal and a fourth node, and an eighth switching element, which is arranged between the fourth node and the second secondary terminal. In particular, the first node of the first full-bridge is connected to a first primary terminal of the transformer, and the second node of the first full-bridge is connected to a second primary terminal of the transformer. Furthermore, the third node of the second full-bridge is connected to a first secondary terminal of the transformer, and the fourth node of the second full-bridge is connected to a second secondary terminal of the transformer. The control device is designed to control the switching elements of the first full-bridge and of the second full-bridge in accordance with the method according to the invention.

Advantages of the Invention

The present invention is based on the knowledge that DC-DC converters, in particular so-called phase-shifted full-bridge DC-DC converters, can also be used, under certain boundary conditions, for power transfer from the secondary side to the primary side when active switching elements are used on the secondary side. If the electrical DC voltage on the primary side exceeds the product of the electrical DC voltage on the secondary side and the transformation ratio of the transformer in the DC-DC converter, the power transfer in the reverse direction can be achieved without any additional components. The switches on the primary side are in this case used either for passive or active rectification. For soft switch-on of the primary-side switches during active control, the primary-side and secondary-side switching elements can be switched using an optimized switching pattern.

By virtue of the introduction of a special switching state, the present invention makes it possible to achieve a high power transfer in the reverse direction when the electrical voltage on the primary side exceeds the abovementioned limit. The demands on the accuracy of the control are in this case reduced for transformers with a low leakage inductance. Furthermore, the total losses and in particular the losses in the secondary-side switches are reduced.

One concept of the present invention consists in reducing, by virtue of a suitable switching pattern, the control of the secondary-side switching elements, in particular in the case of high loads and a small phase shift on the primary side, the RMS wave of the currents in the transformer and in the primary-side switches. In this case, the current in part of the period is distributed among both secondary-side switches. As a result, the power losses in the secondary-side switching elements are reduced.

In accordance with one embodiment, the electrical voltage at the primary terminal of the DC-DC converter is greater than the product of the electrical voltage at the secondary terminal of the DC-DC converter multiplied by the transformation ratio of the transformer.

The transformation ratio of the transformer in this case in particular results from the quotient of the turns number on the primary side divided by the number of turns on the secondary side.

In accordance with one embodiment, the method comprises the following steps: in a first step, the first terminal of the secondary side of the transformer is connected to the first terminal of the secondary side of the DC-DC converter, the second terminal of the secondary side of the transformer is connected to the second terminal of the secondary side of the DC-DC converter, the first terminal of the primary side of the transformer is connected to the first terminal of the primary side of the DC-DC converter, and the second terminal of the primary side of the transformer is connected to the second terminal of the primary side of the DC-DC converter. Thereupon, in a second step, the first terminal of the secondary side of the transformer, the second terminal of the secondary side of the transformer, the first terminal of the secondary side of the DC-DC converter and the second terminal of the secondary side of the DC-DC converter are connected to one another. Thereupon, in a third step, the connection between the second terminal of the primary side of the transformer and the second terminal of the primary side of the DC-DC converter is disconnected, and the second terminal of the primary side of the transformer is connected to the first terminal of the primary side of the DC-DC converter. Thereupon, in a fourth step, disconnection of the connection between the first terminal of the secondary side of the transformer and the second terminal of the secondary side of the transformer takes place. In addition, in the fourth step, the connection between the first terminal of the secondary side of the DC-DC converter and the second terminal of the secondary side of the DC-DC converter is disconnected. Furthermore, in the fourth step, an electrical connection between the first terminal of the secondary side of the DC-DC converter and the second terminal of the secondary side of the transformer as well as between the second terminal of the secondary side of the DC-DC converter and the first terminal of the secondary side of the transformer is provided.

In this case, in particular the switching state, as has been set after the third step, corresponds to the special switching state, as is newly introduced in accordance with the present invention.

In accordance with one embodiment, the method further comprises the following steps: in a fifth step, a connection of the second terminal of the secondary side of the transformer to the first terminal of the secondary side of the DC-DC converter takes place. At the same time, a connection of the first terminal of the secondary side of the transformer to the second terminal of the secondary side of the DC-DC converter takes place. In addition, a connection of the second terminal of the primary side of the transformer to the first terminal of the primary side of the DC-DC converter and a connection of the first terminal of the primary side of the transformer to the second terminal of the primary side of the DC-DC converter take place. Thereupon, in a sixth step, the first terminal of the secondary side of the transformer, the second terminal of the secondary side of the transformer, the first terminal of the secondary side of the DC-DC converter and the second terminal of the secondary side of the DC-DC converter are connected to one another. Thereupon, in a seventh step, the connection between the first terminal of the primary side of the transformer and the first terminal of the primary side of the DC-DC converter can be disconnected, and the second terminal of the primary side of the transformer can be connected to the second terminal of the primary side of the DC-DC converter. Finally, in an eighth step, the disconnection of the connection between the first terminal of the secondary side of the transformer and the second terminal of the secondary side of the transformer takes place. In addition, in the eighth step, the connection between the second terminal of the secondary side of the DC-DC converter and the first terminal of the secondary side of the DC-DC converter is disconnected. In addition, in the eighth step, a provision of an electrical connection between the second terminal of the secondary side of the DC-DC converter and the first terminal of the secondary side of the transformer as well as between the first terminal of the secondary side of the DC-DC converter and the second terminal of the secondary side of the transformer takes place.

The sequence of the fifth to eighth steps of the above-described embodiment in this case corresponds to the sequence of the first to fourth steps with the inverse direction of current flow. In this way, as uniform loading of the switching elements in the DC-DC converter as possible takes place. In particular, the switching state, as is set once the seventh step has been reached, also likewise corresponds to the special switching state according to the invention.

For energy transmission from the secondary side of the DC-DC converter to the primary side of the DC-DC converter, the above-described sequence of steps can be repeated periodically.

In accordance with one embodiment, a series inductance can be provided between a node, at which the fifth and the seventh switching elements are electrically connected to one another, and a first terminal of the secondary side of the DC-DC converter.

In accordance with a further embodiment, the transformer of the DC-DC converter may be a transformer having a low leakage inductance.

The above configurations and developments can be combined with one another as desired, insofar as this is sensible. Further configurations, developments and implementations of the invention also include combinations which have not been explicitly mentioned of features of the invention which have been described above or below with respect to the exemplary embodiments. In particular, in this case, a person skilled in the art will also add individual aspects as improvements or additions to the respective basic forms of the invention.

BRIEF DESCRIPTION OF THE DRAWINGS

Further features and advantages of the invention will be explained below with reference to the figures, in which.

DETAILED DESCRIPTION

Figure 1:
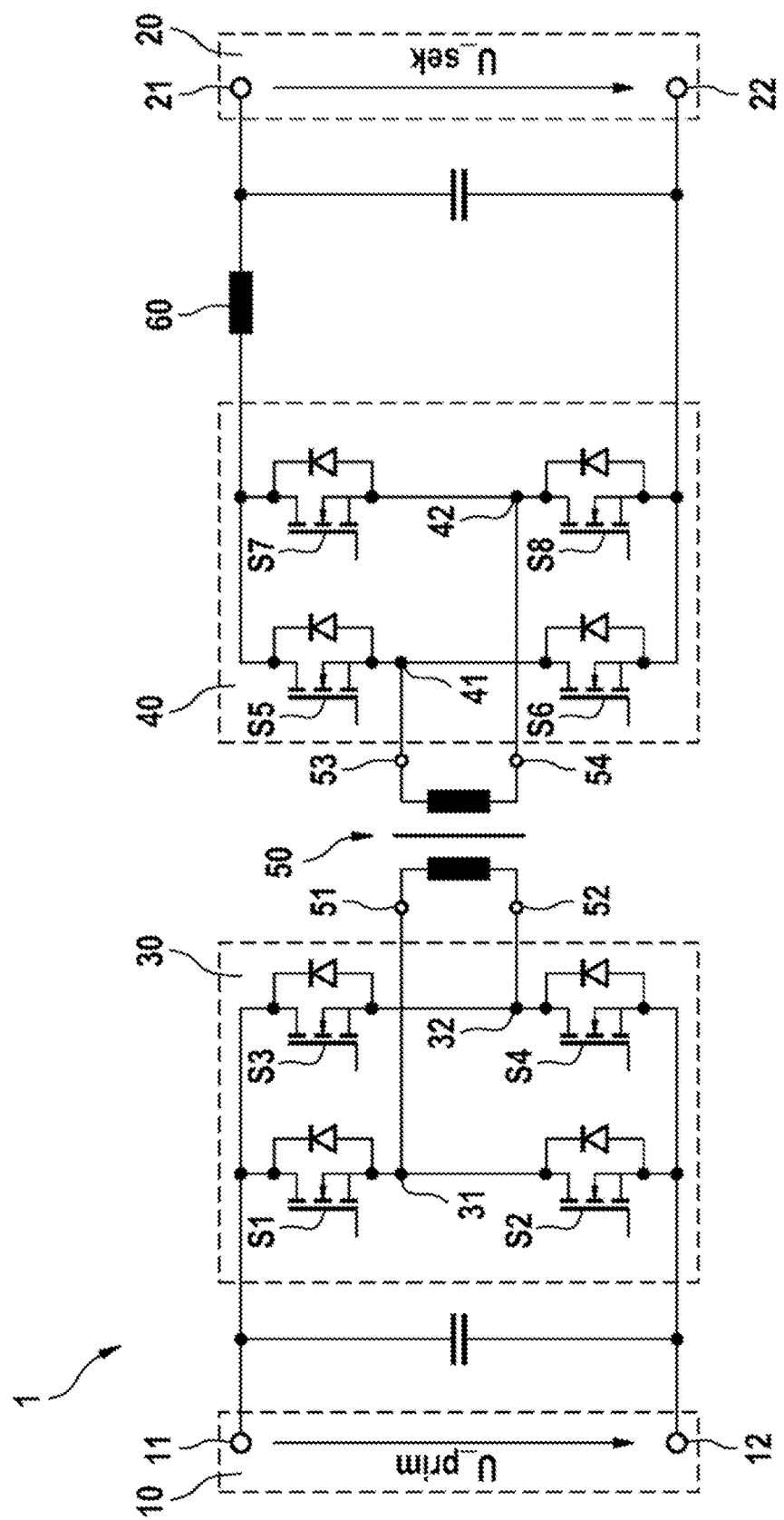
FIG. 1 shows a schematic illustration of a basic circuit diagram, as forms the basis of a DC-DC converter in accordance with one embodiment.

FIG. 1 shows a schematic illustration of a basic circuit diagram, as forms the basis of a DC-DC converter 1, in particular a phase-shifted full-bridge DC-DC converter in accordance with one embodiment. The DC-DC converter 1 comprises, on the primary side, a terminal element 10 having a first primary terminal 11 and a second primary terminal 12. A DC voltage U_prim can be present between the first terminal 11 and the second terminal 12 of the primary side. Similarly, a terminal element 20 on the secondary side comprises a first secondary terminal 21 and a second secondary terminal 22. A DC voltage U_sek can be present between the first terminal 21 and the second terminal 22 of the secondary side. For example, the DC-DC converter 1 can be coupled on the primary side to a high-voltage power supply system of an electric vehicle, and the secondary side of the DC-DC converter 1 can be coupled to a low-voltage power supply system of an electric vehicle. However, in principle any other desired application possibilities for such a DC-DC converter 1 are also possible.

Furthermore, the DC-DC converter 1 has a first full-bridge 30, a second full-bridge 40 and a transformer 50. The transformer 50 is connected on the primary side to the first full-bridge 30 and on the secondary side to the second full-bridge 40.

The first full-bridge 30 comprises a first switching element S1, which is arranged between the first primary terminal 11 and a first node 31, a second switching element S2, which is arranged between the first node 31 and the second primary terminal 12, a third switching element S3, which is arranged between the first primary terminal 11 and a second node 32, and a fourth switching element S4, which is arranged between the second node 32 and the second primary terminal 12. The first node 31 is connected to a first terminal 51 of the primary side of the transformer 50, and the second node 32 is connected to a second primary terminal 52 of the transformer 50.

Similarly, the second full-bridge 42 comprises the four switching elements S5 to S8. The switching element S5 is connected on one side to a third node 41, and is electrically coupled on the other side to the first secondary terminal 21. The switching element S6 is arranged between the third node 41 and the second secondary terminal 22. The switching element S7 is arranged between a fourth node 42 and the first secondary terminal 22, and the switching element S6 is arranged between the fourth node 42 and the second secondary terminal 22.

A series inductance 60 can be provided between a connecting point at which the switching element S5 and the switching element S7 are connected to one another and the first secondary terminal 22. The third node 41 is connected to a first terminal 53 of the secondary side of the transformer 50, and the fourth node 42 is connected to a second secondary terminal 54 of the transformer 50.

Finally, a control device (not illustrated) is provided, which controls the switching elements S1 to S4 of the first full-bridge and the switching elements S5 to S8 of the second full-bridge in a suitable manner. In particular a switching sequence for an electrical energy transmission from the secondary side to the primary side of the DC-DC converter 1, as can take place, for example, by means of the control device, is explained in more detail below.

Figure 2:
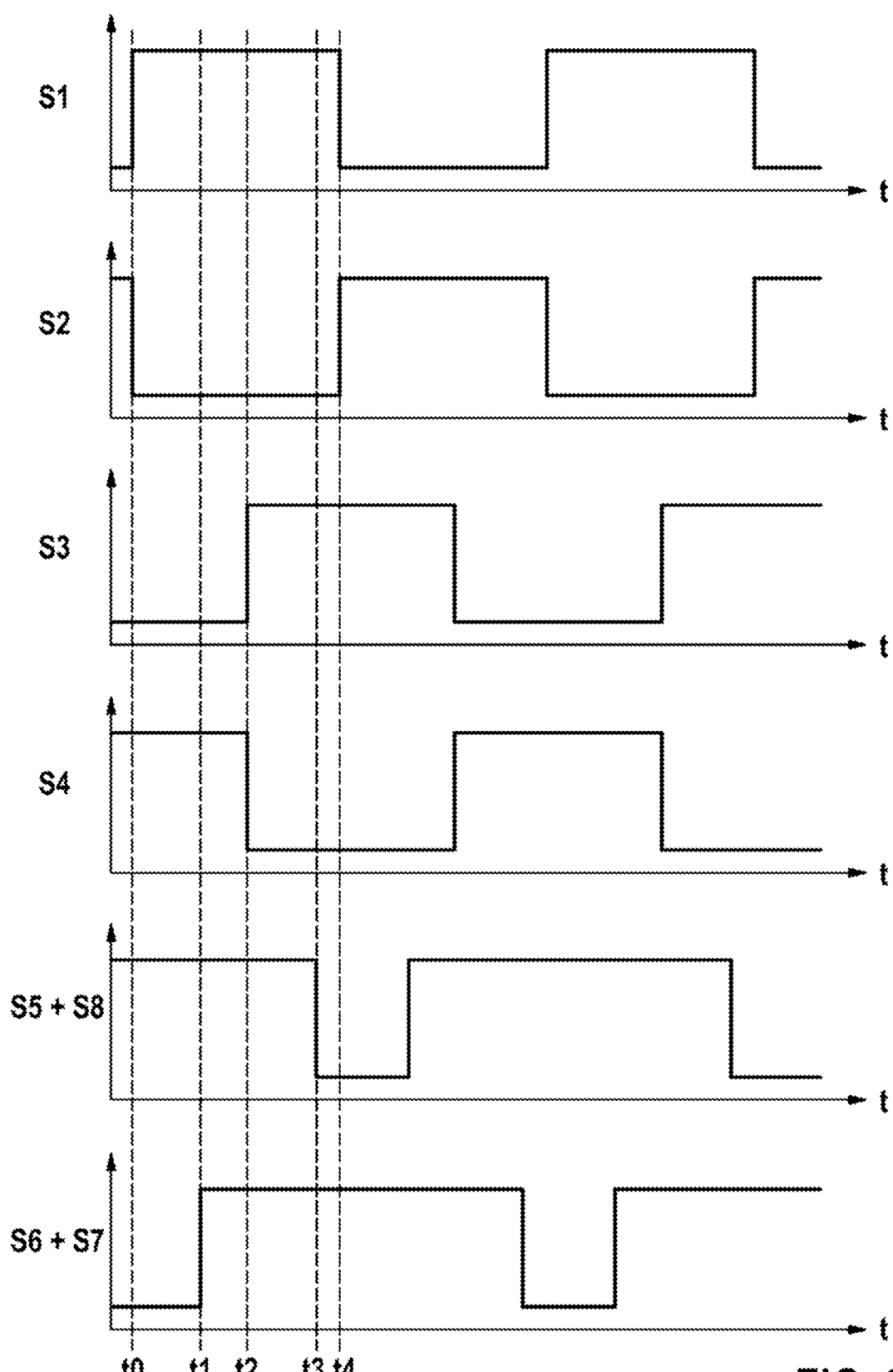
FIG. 2 shows a timing diagram for a sequence of switching states, as forms the basis of a method for operating the DC-DC converter in accordance with one embodiment.

FIG. 2 shows a timing diagram for the switching states of the switching elements S1 to S8 of the full-bridges 30 and 40, as they can be provided during an energy transmission from the secondary side to the primary side of the DC-DC converter 1.

At time t0, in the first full-bridge 20 on the primary side in one diagonal branch, the first switching element S1 and the fourth switching element S4 are controlled, with the result that these switching elements are turned on. The switching elements in the other diagonal branch comprising the second and third switching elements S2 and S3, on the other hand, are open. Furthermore, the switching elements S5 and S8 in one diagonal branch of the second full-bridge 40 are on, and the switching elements S6 and S7 in the other diagonal branch are open. In this way, between t0 and t1, electrical power is transmitted from the secondary side to the primary side of the DC-DC converter. At time t1, the two remaining secondary-side switches S6 and S8 are likewise controlled and therefore turned on, with the result that all four secondary-side switches S5 to S8 are in the closed state. Therefore, the transformer current decreases very quickly as a result of the primary-side voltage, which is present across the leakage inductance of the transformer 50, and becomes negative. At time t2, the fourth switching element S4 switches off, and the third switching element S3 is controlled and is therefore turned on. The transformer current must therefore be negative at time t2 in order to achieve soft switching-on of the third switching element S3. In order to reduce the reactive current between time t2 and t3, therefore, a low absolute value for the transformer current at time t2 is preferred.

In this special switching state between t2 and t3, therefore, on the primary side the first switching element S1 and the third switching element S3 are on, as a result of which the first terminal 51 and the second terminal 52 on the primary side of the transformer 50 are electrically connected to one another. On the secondary side, all four switching elements S5 to S8 of the second full-bridge 40 are actively controlled and therefore on. Therefore, on the secondary side, the terminals 53, 54 of the secondary terminal of the transformer are electrically connected to one another, and the terminals 21, 22 on the secondary side of the DC-DC converter 1 are likewise electrically connected to one another, via the series inductance 60.

Between times t2 and t3, the transformer current decreases further owing to the resistances in the transformer 50 and the switching elements in the full-bridges. This results in the current through the secondary-side inductance 60 being conducted uniformly by all four secondary-side switching elements S5 to S8 in the second full-bridge 40. Correspondingly, owing to the reduction in the reactive current in this phase, the losses in all switches and in the transformer 50 can be reduced.

At time t3, the switching elements S5 and S8 in the second full-bridge 40 are opened. The current through the secondary-side inductance 60 therefore needs to be completely conducted by the transformer 50 again. Owing to the leakage inductance of the transformer 50, therefore, there is an overvoltage across the secondary-side switches at time t3. Owing to the typically low leakage inductance of the transformers in the phase-shifted full-bridge DC-DC converters and snubber networks which may be present across the secondary-side switches, the resultant overvoltage does not impair the operation up to high power transmissions in the reverse direction. Up to time t4, the current is conducted in "freewheeling" fashion via the first and third switching elements S1 and S3, with the result that, furthermore, at least approximately a voltage of approximately 0 volt is present across the secondary-side switches. Since the losses in the switches and the transformer 50 are increased markedly between t3 and t4 without any power transmission, this time period is preferably selected to be as short as possible.

At time t4, the first switching element S1 switches off, and the second switching element S2 is switched on. The previously described switching operation takes place in turn with soft-switching owing to the negative transformer current, with the result that likewise soft switching-on is achieved for all primary-side switching operations. At time t4, the second half of a period begins with the power transmission from the secondary side to the primary side, which second half of the period runs symmetrically and analogously to the above-described first half of the period.

Figure 3:
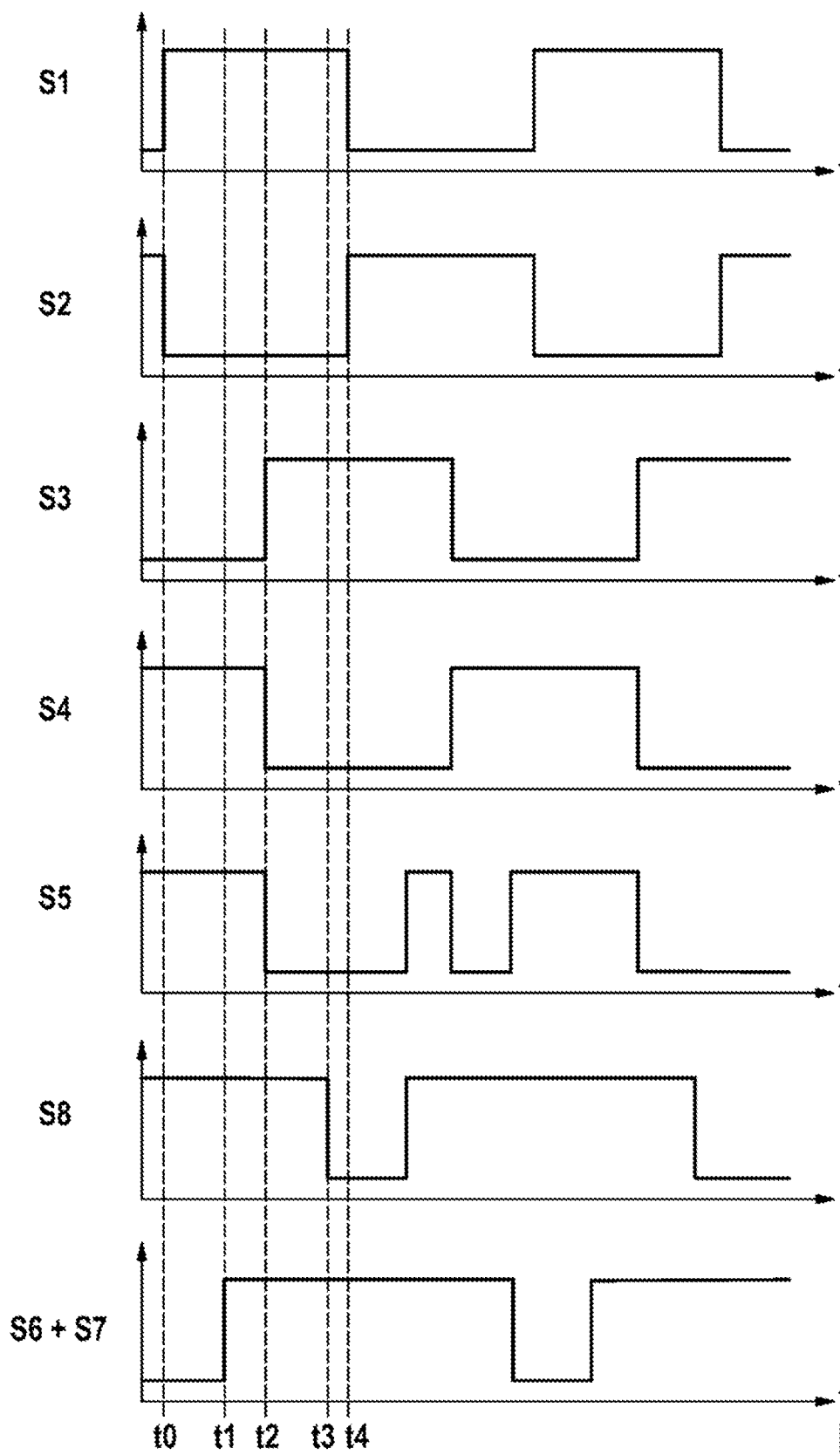
FIG. 3 shows a timing diagram for the switching states in a DC-DC converter in accordance with a further embodiment.

FIG. 3 shows a graph for a switching sequence for controlling a DC-DC converter for an energy transmission from the secondary side to the primary side in accordance with a further exemplary embodiment. The switching sequence in accordance with this exemplary embodiment differs from the previously described switching sequence in particular in that, between times t2 and t3 (and similarly in the second half of the period), in each case only three switching elements of the four switching elements S5 to S8 of the second full-bridge 40 are on. One of the switching elements S5 to S8 of the secondary-side full-bridge 40 is in this case open. In FIG. 3, this is, for example, the switching element S5. Furthermore, the statements made previously in connection with FIG. 2 apply.

Figure 4:
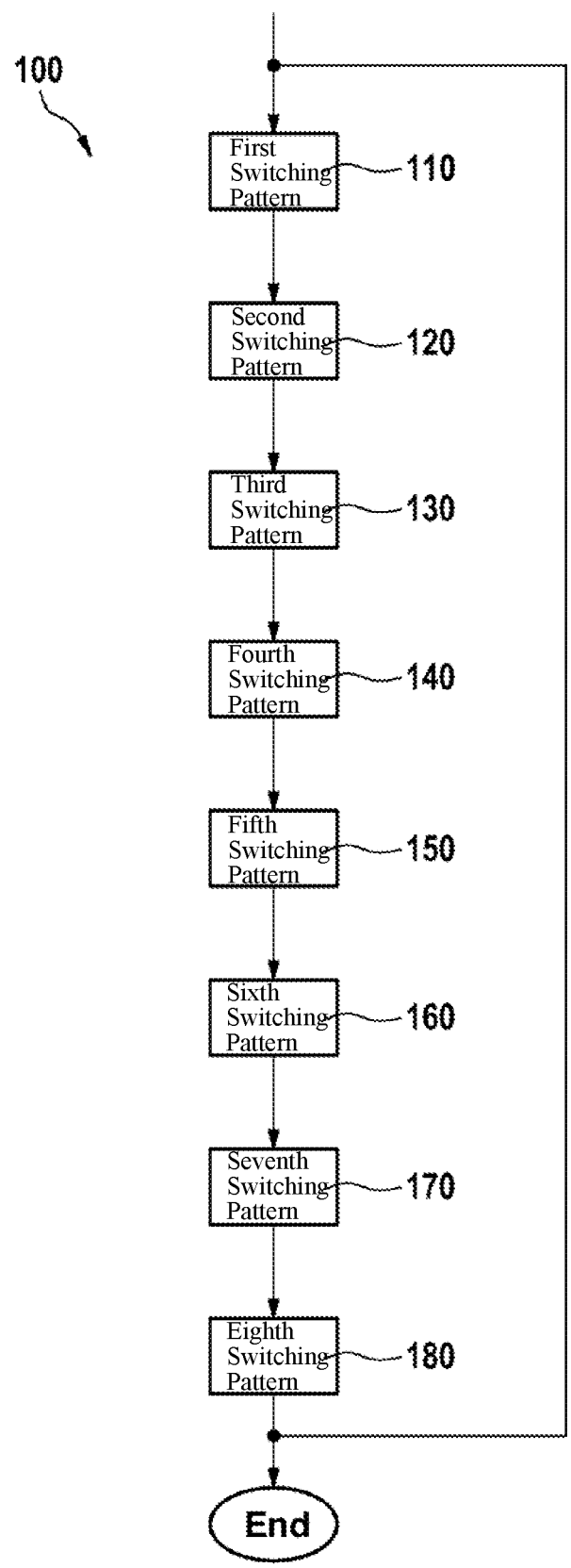
FIG. 4 shows a schematic illustration of a flowchart, as forms the basis of a method for controlling a DC-DC converter in accordance with one embodiment.

FIG. 4 shows a flowchart, as forms the basis of a method 100 for controlling a DC-DC converter 1 in accordance with one embodiment. In particular, the method can comprise the sequences described previously in connection with FIG. 1 to FIG. 3.

At time t0, in a step 110, a first terminal 53 of the secondary side of the transformer 50 can be connected to a first terminal 22 of the secondary side of the DC-DC converter. Furthermore, a second terminal 54 of the secondary side of the transformer 50 is connected to a second terminal 22 of the secondary side of the DC-DC converter 1. Furthermore, a first terminal 51 of the primary side of the transformer 50 is connected to a first terminal 11 of the primary side of the DC-DC converter 1, and a second terminal 52 of the primary side of the transformer 50 is connected to a second terminal 12 of the primary side of the DC-DC converter 1.

At time t1, in a second step 120, the first terminal 53 of the secondary side of the transformer 50, the second terminal 54 of the secondary side of the transformer 50, the first terminal 21 of the secondary side of the DC-DC converter and the second terminal 22 of the secondary side of the DC-DC converter are connected to one another. In other words, therefore, an electrical connection of the secondary-side terminals 53, 54 of the transformer 50 and, if appropriate via the series inductance 60, the secondary-side DC-DC converter terminals 21, 22 takes place.

Thereupon, at time t2, in step 130, a disconnection of the connection between the second terminal 52 of the primary side of the transformer 50 and the second terminal 12 of the primary side of the DC-DC converter 1 takes place. Furthermore, in step 130, a connection of the second terminal 52 of the primary side of the transformer 50 to the first terminal 11 of the primary side of the DC-DC converter 1 takes place.

Finally, at time t3, in step 140, the disconnection of the connection between the first terminal 53 of the secondary side of the transformer 50 and the second terminal 54 of the secondary side of the transformer 50 and the disconnection of the connection between the first terminal 21 of the secondary side of the DC-DC converter 1 and the second terminal 22 of the secondary side of the DC-DC converter 1 take place. In addition, in this step 140, a connection between the second terminal 22 of the secondary side of the DC-DC converter 1 and the first terminal 53 of the secondary side of the transformer 50 takes place.

Owing to steps 110 to 140, therefore, the first half of a power transmission from the secondary side to the primary side of the DC-DC converter 1 takes place. Thereupon, owing to steps 150 to 180, the second half of a period for power transmission from the secondary side to the primary side can be implemented. In this case, steps 150 to 180 follow a similar switching pattern to steps 110 to 140, with the reverse current flow through the transformer 50.

By way of summary, the present invention relates to power transmission in a DC-DC converter, in particular a phase-shifted full-bridge DC-DC converter, from the secondary side to the primary side. In this case, in particular an additional switching state is provided, which can reduce the power losses of the switching elements in the DC-DC converter.

The invention claimed is:

1. A method (100) for controlling a phase-shifted full-bridge DC-DC converter (1) for an energy transmission from a secondary side, having a first secondary terminal (21) and a second secondary terminal (22), to a primary side, having a first primary terminal (11) and a second primary terminal (12), of the DC-DC converter (1),
   wherein the primary side of the DC-DC converter (1) includes a first full-bridge (30) having a first switching element (S1) arranged between the first primary terminal (11) of the DC-DC converter (1) and a first node (31) of the first full-bridge (30) and a second switching element (S2) arranged between the first node (31) and the second primary terminal (12),
   wherein a transformer (50) is arranged between the primary side and the secondary side of the DC-DC converter (1), wherein a first primary terminal (51) of a primary side of the transformer (50) is directly connected to the first node (31) of the first full-bridge (30), and
   wherein the method (100) comprises electrically connecting, in a switching state, the first primary terminal (51) of the primary side of the transformer (50) and a second primary terminal (52) of the primary side of the transformer (50) to one another, electrically connecting, in the switching state, a first secondary terminal (53) of a secondary side of the transformer (50) and a second secondary terminal (54) of the secondary side of the transformer (50), and electrically connecting the first secondary terminal (21) of the secondary side of the phase-shifted full-bridge DC-DC converter (1) and a second secondary terminal (22) of the secondary side of the phase-shifted full-bridge DC-DC converter (1) to one another,
   wherein the method (100) comprises the following steps as a sequence of switching states:
      controlling, by turning on, a first diagonal branch of the first full-bridge (30) of the primary side of the DC-DC converter (1) and a first diagonal branch of a second full-bridge (40) of the secondary side of the DC-DC converter (1), wherein energy is transferred from the secondary side of the DC-DC converter (1) to the primary side of the DC-DC converter (1);
      controlling, by turning on, a second diagonal branch of the second full-bridge (40) of the secondary side of the DC-DC converter (1); and
      controlling, by turning off, a fourth switching element of the first full-bridge (30) of the primary side of the DC-DC converter (1) and, by turning on, a third switching element of the first full-bridge (30) of the primary side of the DC-DC converter (1), wherein the first diagonal branch of the first full-bridge (30) includes the fourth switching element, and wherein a second diagonal branch of the first full-bridge (30) includes the third switching element.

2. The method (100) as claimed in claim 1, wherein an electrical voltage (U_prim) at the primary side of the DC-DC converter (1) is greater than a product of an electrical voltage (U_sek) at the secondary side of the DC-DC converter (1) multiplied by a transformation ratio of the transformer (50).

3. The method (100) as claimed in claim 1, wherein the method (100) further comprises:
   connecting (110) the first secondary terminal (53) of the secondary side of the transformer (50) to the first secondary terminal (21) of the secondary side of the DC-DC converter (1), connecting a second secondary terminal (54) of the secondary side of the transformer (50) to the second secondary terminal (22) of the secondary side of the DC-DC converter (1), connecting the first primary terminal (51) of the primary side of the transformer (50) to a first primary terminal (11) of the primary side of the DC-DC converter (1), and connecting a second primary terminal (52) of the primary side of the transformer (50) to a second terminal (12) of the primary side of the DC-DC converter (1);

connecting (120) the first secondary terminal (53) of the secondary side of the transformer (50), the second secondary terminal (54) of the secondary side of the transformer (50), the first secondary terminal (21) of the secondary side of the DC-DC converter (1) and the second secondary terminal (22) of the secondary side of the DC-DC converter (1);

disconnecting (130) the connection between the second primary terminal (52) of the primary side of the transformer (50) and the second terminal (12) of the primary side of the DC-DC converter (1), and connecting the second primary terminal (52) of the primary side of the transformer (50) to the first primary terminal (11) of the primary side of the DC-DC converter (1);

disconnecting (140) the connection between the first secondary terminal (53) of the secondary side of the transformer (50) and the second secondary terminal (54) of the secondary side of the transformer (50) and the connection between the first secondary terminal (21) of the secondary side of the DC-DC converter (1) and the second secondary terminal (22) of the secondary side of the DC-DC converter (1), and providing an electrical connection between the first secondary terminal (21) of the secondary side of the DC-DC converter (1) and the second secondary terminal (54) of the secondary side of the transformer (50) as well as between the second secondary terminal (22) of the secondary side of the DC-DC converter (1) and the first secondary terminal (53) of the secondary side of the transformer (50).

4. The method (100) as claimed in claim 3, wherein the method (100) further comprises:

connecting (150) the second secondary terminal (54) of the secondary side of the transformer (50) to the first secondary terminal (21) of the secondary side of the DC-DC converter (1), connecting the first secondary terminal (53) of the secondary side of the transformer (50) to the second secondary terminal (22) of the secondary side of the DC-DC converter (1), connecting the second primary terminal (52) of the primary side of the transformer (50) to the first primary terminal (11) of the primary side of the DC-DC converter (1), and connecting the first primary terminal (51) of the primary side of the transformer (50) to the second terminal (12) of the primary side of the DC-DC converter (1);

connecting (160) the first secondary terminal (53) of the secondary side of the transformer (50), the second secondary terminal (54) of the secondary side of the transformer (50), the first secondary terminal (21) of the secondary side of the DC-DC converter (1) and the second secondary terminal (22) of the secondary side of the DC-DC converter (1);

disconnecting (170) the connection between the first primary terminal (51) of the primary side of the transformer (50) and the first primary terminal (11) of the primary side of the DC-DC converter (1), and connecting the first primary terminal (51) of the primary side of the transformer (50) to the second terminal (12) of the primary side of the DC-DC converter (1);

disconnecting (180) the connection between the first secondary terminal (53) of the secondary side of the transformer (50) and the second secondary terminal (54) of the secondary side of the transformer (50), and disconnecting the connection between the second secondary terminal (22) of the secondary side of the DC-DC converter (1) and the first secondary terminal (21) of the secondary side of the DC-DC converter (1), and providing an electrical connection between the second secondary terminal (22) of the secondary side of the DC-DC converter (1) and the first secondary terminal (53) of the secondary side of the transformer (50) as well as between the first secondary terminal (21) of the secondary side of the DC-DC converter (1) and the second secondary terminal (54) of the secondary side of the transformer (50).

5. The method (100) as claimed in claim 1, wherein the sequence of switching states includes:

controlling, by turning off, a first switching element of the second full-bridge (40) of the secondary side of the DC-DC converter (1), wherein the first diagonal branch of the second full-bridge (40) includes the first switching element of the second full-bridge (40).

6. A phase-shifted full-bridge DC-DC converter (1), comprising a transformer (50) having a primary side and a secondary side;

a first switching element (S1), which is arranged between a first primary terminal (11) of the DC DC converter (1) and a first node (31), a second switching element (S2), which is arranged between the first node (31) and a second primary terminal (12), a third switching element (S3), which is arranged between the first primary terminal (11) of the DC-DC converter (1) and a second node (32), a fourth switching element (S4), which is arranged between the second node (32) and the second primary terminal (12), wherein the first node (31) is directly connected to a first primary terminal (51) of the transformer (50), and the second node (32) is connected to a second primary terminal (12) of the transformer (50);

a fifth switching element (S5), which is arranged between a first secondary terminal (21) and a third node (41), a sixth switching element (S6), which is arranged between the third node (41) and a second secondary terminal (22), a seventh switching element (S7), which is arranged between the first secondary terminal (21) and a fourth node (42), an eighth switching element (S8), which is arranged between the fourth node (42) and the second secondary terminal (22), wherein the third node (41) is connected to a first secondary terminal (53) of the transformer (50), and the fourth node (42) is connected to a second secondary terminal (54) of the transformer (50);

a control device, which is configured to control the first to eighth switching elements (S1 to S8) to electrically connect the first primary terminal (51) of the primary side of the transformer (50) and a first primary terminal (52) of the primary side of the transformer (50) to one another, electrically connect the first secondary terminal (53) and the second secondary terminal (54) of a secondary side of the transformer (50), and electrically connect the first secondary terminal (21) and the second secondary terminal (22) of a secondary side of the phase-shifted full-bridge DC-DC converter (1) to one another, wherein the control device is configured to:
control, by turning on, a first diagonal branch of a primary side of the DC-DC converter (1) and a first diagonal branch of the secondary side of the DC-DC converter (1), wherein energy is transferred from the secondary side of the DC-DC converter (1) to the primary side of the DC-DC converter (1);
control, by turning on, a second diagonal branch of the secondary side of the DC-DC converter (1); and
control, by turning off, the fourth switching element (S4) of the primary side of the DC-DC converter (1) and, by turning on, the third switching element (S3) of the primary side of the DC-DC converter (1), wherein the first diagonal branch of the primary side of the DC-DC converter (1) includes the fourth switching element (S4), and wherein a second diagonal branch of the primary side of the DC-DC converter (1) includes the third switching element (S3).

7. The DC-DC converter (1) as claimed in claim 6, wherein a series inductance (60) is arranged between the first secondary terminal (21) and a connecting point between the fifth switching element (S5) and the seventh switching element (S7).

8. The DC-DC converter (1) as claimed in claim 6, wherein the transformer (50) has a leakage inductance.

9. A method (100) for controlling a phase-shifted full-bridge DC-DC converter (1) for an energy transmission from a secondary side, having a first secondary terminal (21) and a second secondary terminal (22), to a primary side having a first primary terminal (11) and a second primary terminal (12) of the DC-DC converter (1), wherein a transformer (50), having a primary side and secondary side, is arranged between the primary side and the secondary side of the DC-DC converter (1), wherein the transformer (50) having a first primary terminal (51) and a second primary terminal (52) of the primary side and a first secondary terminal (53) and a second secondary terminal (54) of the secondary side, wherein the transformer (50) is connected to a first full bridge (30) of the DC-DC converter (1) and a second full bridge (40) of the DC-DC converter (1),
wherein the first full bridge (30) comprises four switching elements (S1-S4),
wherein the second full bridge (40) comprises four switching elements (S5-S8),
wherein a first node (31) of the first full bridge (30) is connected to the first primary terminal (51) of the transformer (50) and a second node (32) of the first full bridge (30) is connected to the second primary terminal (52) of the transformer (50),
wherein a fifth switching element (S5) is arranged between the first secondary terminal (21) and a third node (41) of the second full bridge (40),
wherein a sixth switching element (S6) is arranged between the third node (41) and the second secondary terminal (22),
wherein a seventh switching element (S7) is arranged between the first secondary terminal (21) and a fourth node (42) of the second full bridge (40), wherein an eighth switching element (S8) is arranged between the fourth node (42) and the second secondary terminal (22),
wherein a series inductance (60) is arranged between the first secondary terminal (21) and a connecting point between the fifth switching element (S5) and the seventh switching element (S7), and
wherein the method (100) comprises a switching state, wherein the first primary terminal (51) and the second primary terminal (52) of the primary side of the transformer (50) are electrically connected to one another, electrically connecting, wherein the first secondary terminal (53) and the second secondary terminal (54) of the secondary side of the transformer (50) and the first secondary terminal (21) and the second secondary terminal (22) of the secondary side of the phase-shifted full-bridge DC-DC converter (1) are electrically connected to one another via the series inductance (60),
wherein the method (100) comprises the following steps as a sequence of switching states:
connecting (110), by controlling a second diagonal branch of the second full-bridge (40), the first secondary terminal (53) of the secondary side of the transformer (50) to the first terminal (21) of the secondary side of the DC-DC converter (1), connecting, by controlling a second diagonal branch of the second full-bridge (40), the second secondary terminal (54) of the secondary side of the transformer (50) to the second secondary terminal (22) of the secondary side of the DC-DC converter (1), connecting, by controlling a first diagonal branch of the first full-bridge (30), the first primary terminal (51) of the primary side of the transformer (50) to the first primary terminal (11) of the primary side of the DC-DC converter (1), and connecting, by controlling the first diagonal branch of the first full-bridge (30), the second primary terminal (52) of the primary side of the transformer (50) to the second terminal (12) of the primary side of the DC-DC converter (1);
connecting (120), by controlling the four switching elements (S5-S8) of the second full bridge (40), the first secondary terminal (53) of the secondary side of the transformer (50), the second secondary terminal (54) of the secondary side of the transformer (50), the first secondary terminal (21) of the secondary side of the DC-DC converter (1), and second secondary terminal (22) of the secondary side of the DC-DC converter (1);
disconnecting (130), by controlling the fourth switching element (S4), the connection between the second primary terminal (52) of the primary side of the transformer (50) and the second terminal (12) of the primary side of the DC-DC converter (1), and connecting, by controlling the third switching element (S3), the second primary terminal (52) of the primary side of the transformer (50) to the first terminal (11) of the primary side of the DC-DC converter (1);
disconnecting (140) the connection between the first secondary terminal (53) of the secondary side of the transformer (50) and the second secondary terminal (54) of the secondary side of the transformer (50) and the connection between the first terminal (21) of the secondary side of the DC-DC converter (1) and the second secondary terminal (22) of the secondary side of the DC-DC converter (1), and providing an electrical connection between the first terminal (21) of the secondary side of the DC-DC converter (1) and the second secondary terminal (54) of the secondary side of the transformer (50) as well as between the second secondary terminal (22) of the secondary side of the DC-DC converter (1) and the first secondary terminal (53) of the secondary side of the transformer (50).

\* \* \* \* \*